United States Patent
Atkinson

(10) Patent No.: US 6,811,756 B2
(45) Date of Patent: Nov. 2, 2004

(54) EXHAUST GAS COOLER

(75) Inventor: George Atkinson, Solihull (GB)

(73) Assignee: Honeywell International INC, Morristown, NJ (US)

( * ) Notice: Subject to any disclaimer, the term of this patent is extended or adjusted under 35 U.S.C. 154(b) by 758 days.

(21) Appl. No.: 09/846,030

(22) Filed: Apr. 30, 2001

(65) Prior Publication Data
US 2002/0025282 A1 Feb. 28, 2002

Related U.S. Application Data

(63) Continuation of application No. PCT/GB99/03581, filed on Oct. 29, 1999.

(30) Foreign Application Priority Data

Oct. 30, 1998 (GB) .............................................. 9823669

(51) Int. Cl.$^7$ .................................................. F01N 3/10
(52) U.S. Cl. ........................................ 422/173; 422/177
(58) Field of Search ................................ 422/173, 177, 422/168, 182, 183

(56) References Cited

U.S. PATENT DOCUMENTS

| | | | |
|---|---|---|---|
| 3,748,830 A | | 7/1973 | Ross et al. |
| 3,949,548 A | * | 4/1976 | Lockwood, Jr. ............ 60/39.15 |
| 4,267,812 A | * | 5/1981 | Aula et al. ............. 123/568.12 |
| 4,685,292 A | | 8/1987 | Brigham et al. |
| 5,513,599 A | * | 5/1996 | Nagato et al. ............... 122/4 D |
| 5,732,688 A | * | 3/1998 | Charlton et al. ........ 123/568.12 |
| 6,079,395 A | * | 6/2000 | Coleman ................ 123/568.12 |

FOREIGN PATENT DOCUMENTS

| | | |
|---|---|---|
| DE | 199 07 163 A1 | 10/1999 |
| JP | 59109776 | 6/1984 |
| WO | WO 00/26514 | 5/2000 |

OTHER PUBLICATIONS

Search Report, Feb. 23, 2000.
International Preliminary Examination Report, Mar. 6, 2001.

\* cited by examiner

Primary Examiner—M. Alexandra Elve
(74) Attorney, Agent, or Firm—Ephraim Starr; John Christopher James

(57) ABSTRACT

An exhaust gas cooler for reducing the temperature of exhaust gases from internal combustion engines, comprising an external tube extending between two tube plates or end walls and defining a coolant chamber, coolant inlet and outlet means communicating with the coolant chamber, and a plurality of internal tubes extending between the end walls and arranged to carry the exhaust gas through the coolant chamber. The external tube has a cross-sectional shape which has a height (H) in the major axis which is greater than its width (W) in the minor axis perpendicular to the major axis, preferably oval, or comprising two semi-circles connected by common straight line tangents parallel to the major axis. Such a cross-sectional shape means that the exterior tube has a planar face which simplifies the fitting of mounting brackets and placement with an engine compartment.

13 Claims, 3 Drawing Sheets

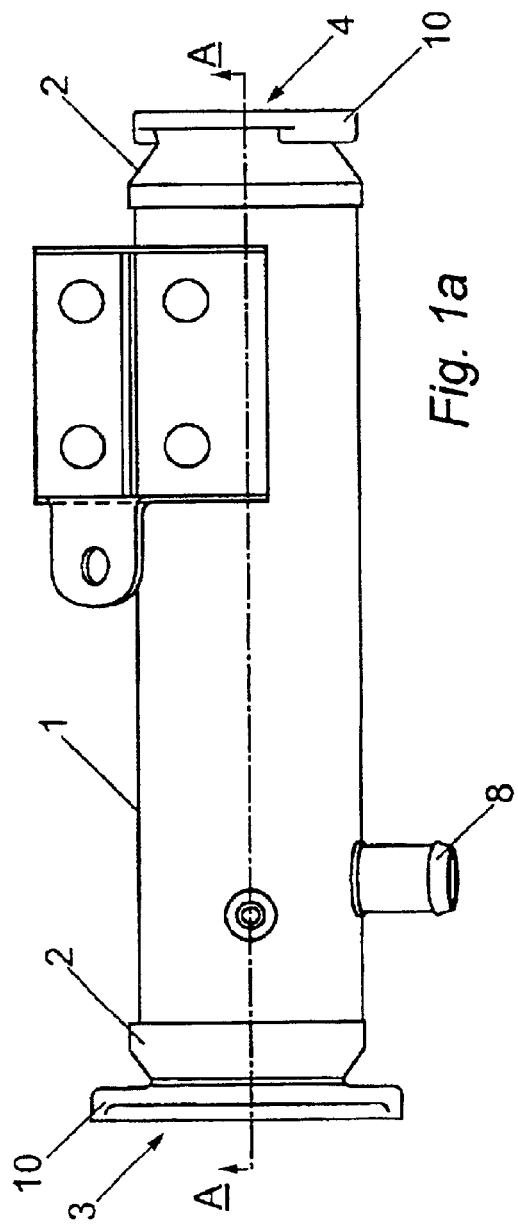
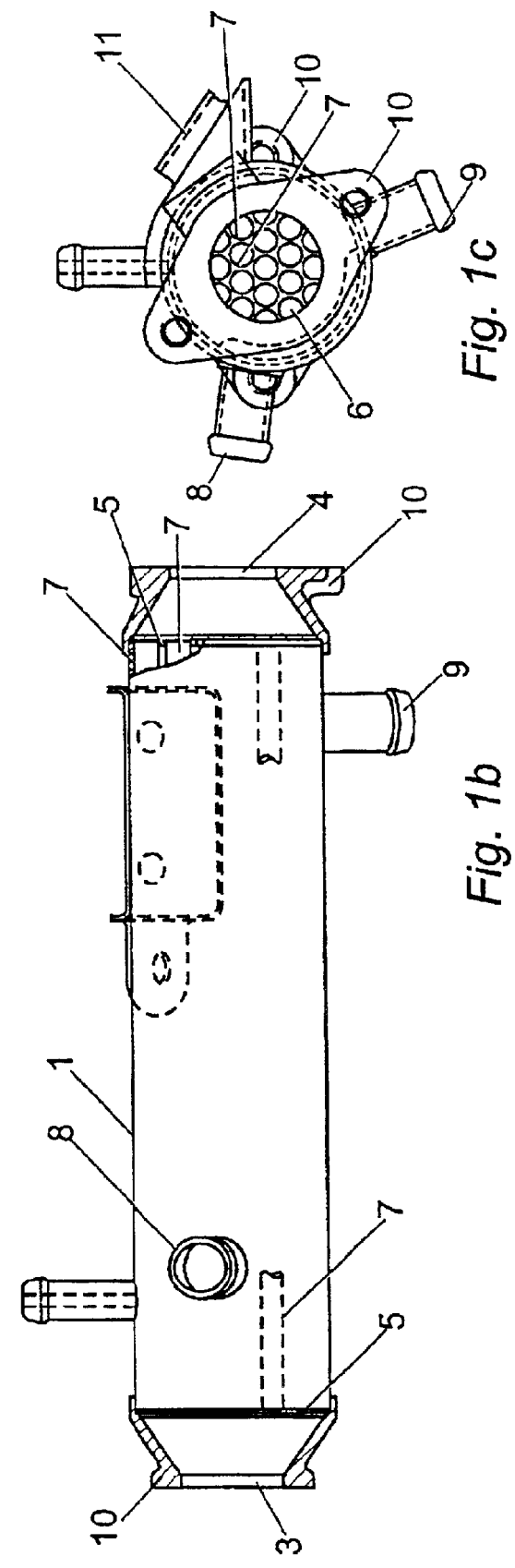
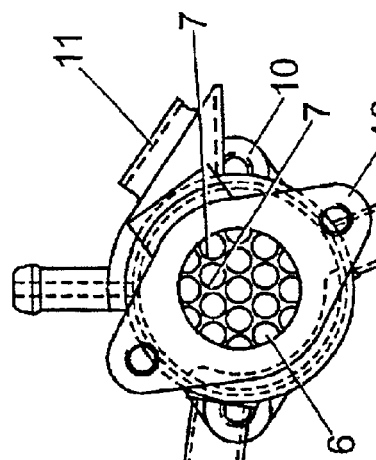
Fig. 1a
Fig. 1b
Fig. 1c

EXHAUST GAS COOLER

This invention relates to an exhaust gas cooler for reducing the temperature of exhaust gases from internal combustion engines. In particular the invention relates to an exhaust gas cooler in which a coolant is passed around passages through which the exhaust gas travels.

FIGS. 1a to 1c show a known exhaust gas cooler. This prior art cooler comprises a circular tube 1 which has tapered ends 2 which serve as entry 3 and exit 4 orifices for exhaust gases. The orifices are provided with flange plates 10 for connection to exhaust pipes. The ends of the tube are sealed by circular tube plates 5 which define a coolant chamber inside the tube. Each tube plate 5 has a number of circular holes 6 arranged through it. The holes 6 in each tube plate 5 are connected by a number of small diameter tubes 7 which are sealed at one end to the first tube plate and at the other end to the second tube plate. Exhaust gases flow into the entry orifice 3, along the inside of the small diameter tubes 7 and out of the exit orifice 4. The exterior of the tube is provided with entry and exit nozzles 8, 9 which communicate with the coolant chamber for the supply of coolant liquid. A bracket 11 is fixed to the tube for mounting the exhaust gas cooler.

Similar prior art exhaust gas coolers are known for example from U.S. Pat. No. 4,685,292. In all the prior art coolers the tubes which carry the exhaust gases are arranged within a cooling chamber of circular cross-section. This results in exhaust gas coolers which are bulky and inefficient in their use of space and do not fit easily within the frequently cramped engine layout. It is an object of the present invention to provide an exhaust gas cooler which is more compact in shape and yet provides flow characteristics comparable or superior to prior art gas coolers.

According to a first aspect of the present invention there is provided an exhaust gas cooler comprising:

an external tube having first and second end walls within said tube, said external tube and end walls defining a coolant chamber between said end walls and first and second exhaust gas chambers outside said first and second end walls respectively, coolant inlet and outlet means communicating with said coolant chamber, a plurality of internal tubes extending from said first end wall to said second end wall and arranged such that the interior of each internal tube communicates with said first and second exhaust gas chambers, and exhaust gas inlet and outlet means communicating with said first and second exhaust gas chambers respectively, wherein the external tube has a cross-sectional shape which has a height in the major axis which is greater than its width in the minor axis perpendicular to the major axis.

Preferably the cross-sectional shape of the external tube is substantially oval, most preferably it comprises two semi-circles connected by common straight line tangents parallel to the major axis. Such a cross-sectional shape means that the exterior tube has a planar face which simplifies the fitting of mounting brackets and placement within an engine compartment. An oval shape offers advantages over rectangular cross-sectional shapes, since the tube is less prone to cracking, and sharp re-entrant angles in the tube are avoided, reducing stress concentration.

Preferably the internal tubes are circular in cross-section. It has been found that circular tubes are less prone to clogging with particles carried by the exhaust gases than rectangular tubes, because they do not present internal corners in which particulate matter can collect.

Preferably the internal tubes are arranged in a hexagonal close packed arrangement, such that each internal tube is spaced by the same spacing from its closest neighbouring internal tubes. Preferably the spacing is less than 2 mm, most preferably less than 1 mm. Preferably the spacing is between 10% and 20% of the diameter of the tubes.

Preferably the exhaust gas cooler is made from stainless steel.

Preferably each of the exhaust gas inlet and outlet means comprises a flange plate adapted to connect to a corresponding flange plate on a connecting exhaust pipe and having an aperture therein to permit the through flow of exhaust gases. Preferably each of said first and second exhaust gas chambers is further defined by a tapering cylindrical member extending from said aperture to said external tube.

Preferably the coolant inlet and outlet means comprise tubular pipes adapted to be connected to a coolant hose, most preferably extending substantially in the plane containing the longitudinal axis of the external tube and the major axis of the cross-section of the external tube. Preferably the coolant inlet means is located adjacent to one of the first and second end walls and the coolant outlet means is located adjacent to the other of the first and second end walls. Preferably the coolant inlet and outlet means extend from opposite sides of the external tube.

Preferably a longitudinally extending portion of the coolant chamber adjacent to each of the coolant inlet and outlet means has no internal tubes extending therethrough, such that it forms a coolant passage having an unobstructed area. This may be achieved by omitting a row of internal tubes from the close-packed arrangement at the top and bottom of the external tube. Preferably the unobstructed area has a minimum transverse dimension greater than the diameter of an internal tube. Preferably the unobstructed area of each passage extends over at least 10% of the internal height of the external tube, most preferably at least 15%.

An embodiment of the invention will now be described, by way of example only, with reference to the accompanying figures, where:

FIGS. 1a, 1b, and 1c are a side elevation, a partial sectional view on line A—A, and an end elevation of a prior art exhaust gas cooler;

Figure 2:
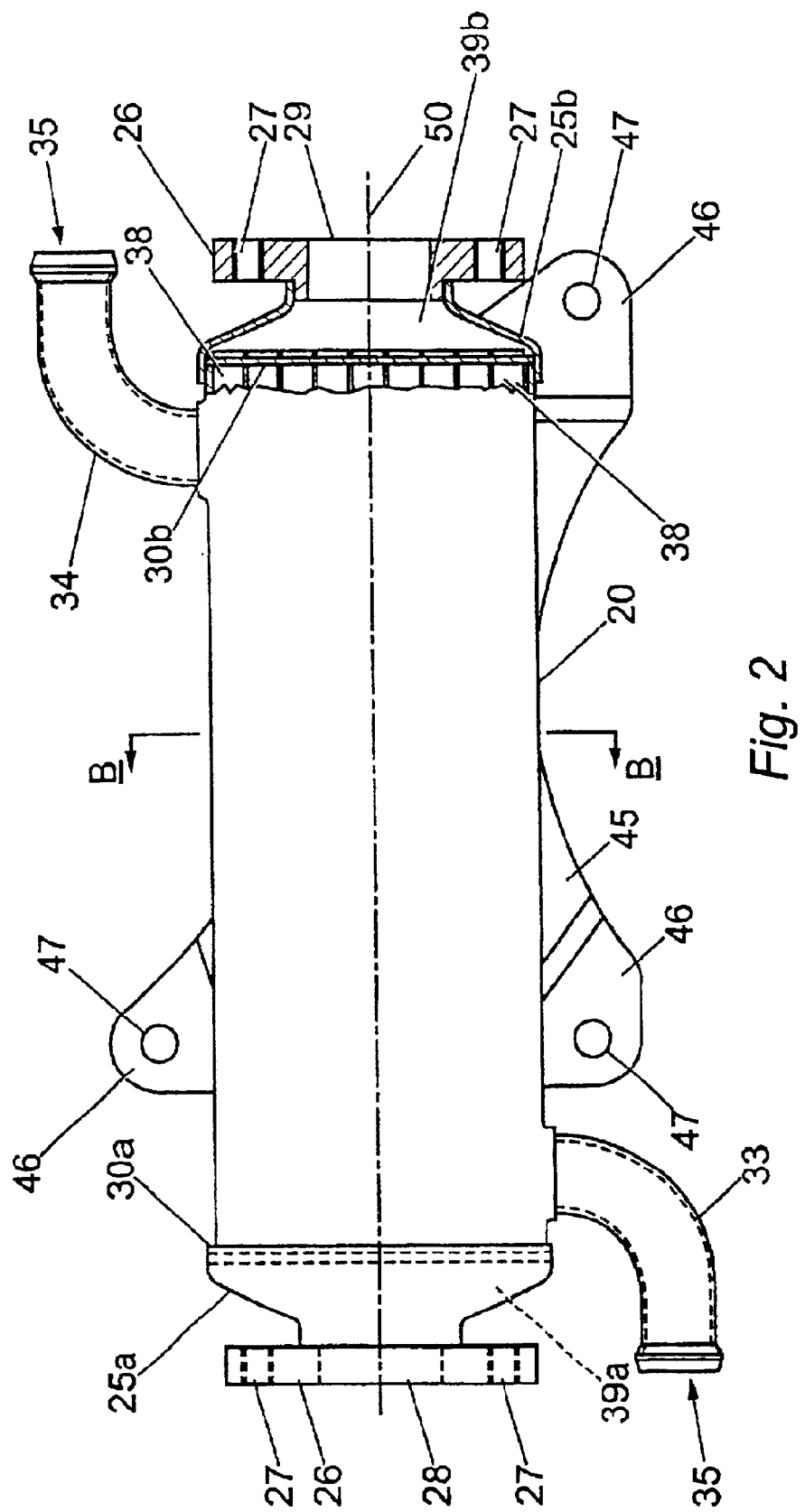
FIG. 2 is a side elevation of an exhaust gas cooler according to a first aspect of the invention.
Figure 4:
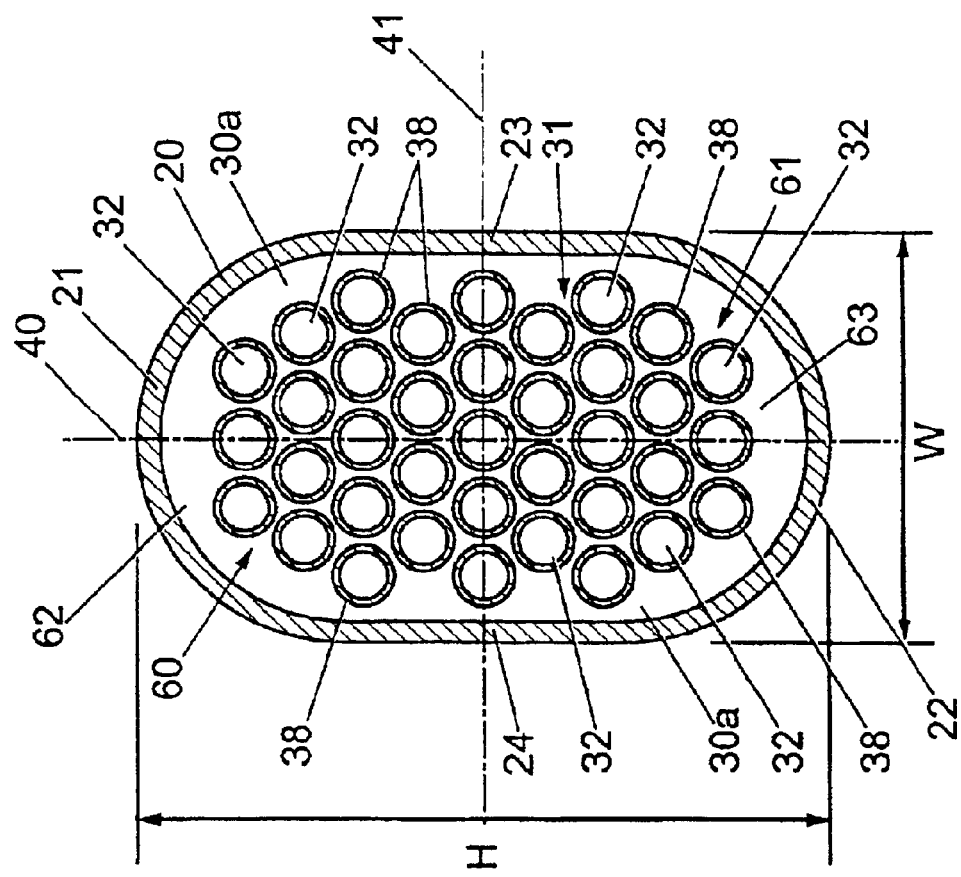
FIG. 4 is a sectional view on line B—B of the device of FIG. 2.
Figure 3:
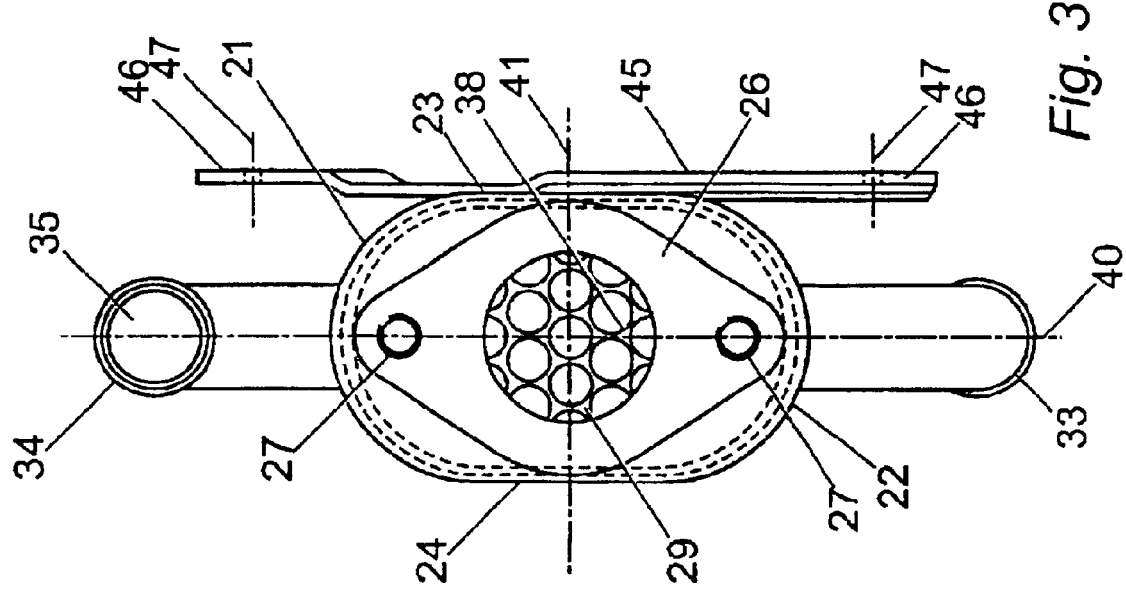
FIG. 3 is an end elevation of the device of FIG. 2.

Referring to FIGS. 2 to 4 there is shown an exhaust gas cooler according to the invention. The cooler comprises an external cylindrical tube 20 whose cross-section comprises two semi-circular portions 21, 22 connected by two tangential portions 23, 24. At each end of the tube are fixed tapered cap portions 25a, 25b which are adapted to fit over the end of the tube and be fastened by suitable means such as welding. At the narrow end of the tapered cap portion 25a, 25b is a flange plate 26 provided with two holes 27 for attachment to a corresponding flange plate (not shown) in order to secure the cooler to an exhaust pipe or line (not shown). The flange plates 26 also each contain a larger hole which serves as entry 28 or exit 29 orifices for exhaust gases.

The ends of the tube 20 are sealed internally by two oval tube plates 30a, 30b, whose shape corresponds to the internal profile of the tube 20. The volume bounded by the tube 20 and plates 30a, 30b forms a coolant chamber 31 inside the tube. Each volume bounded by the tube cap 25a, 25b and the respective plate 30a, 30b forms an exhaust gas chamber 39a, 39b outside the coolant chamber 31 inside the tube. Each tube plate 30a, 30b has 37 circular holes 32 arranged through it. The holes 32 are arranged in a close hexagonal packing (CHP) pattern as shown in FIG. 4 in 9 rows of 3, 4 or 5 holes. The holes 32 in each tube plate 30a, 30b are connected by 37 small diameter tubes 38 which are sealed at one end to the first tube plate 30a and at the other end to the second tube plate 30b.

It has been found that a CHP pattern maximises the flow efficiency, while the particular arrangement of FIG. 4, in which the three principal axes are arranged perpendicular to and at 30° to the major axis 40 of the tube 20 provides an optimum means of packing the interior tubes within the exterior tube.

Exhaust gases flow into the entry orifice 28, along the inside of the small diameter tubes 38 and out of the exit orifice 29. The tubes 38 have a diameter of between 5 and 8 mm, usually about 6.5 mm. The spacing between the tubes is about 1 mm or less, so the tube plate 30a does not present a significant obstruction to flow of the exhaust gases.

Arranged at a first end of the exterior tube is a cooling water inlet pipe 33 whose longitudinal axis is in the same plane as the longitudinal axis 50 and the major axis 40 of the exterior cylinder 20. In this way the hose connections (not shown) will not extend outside the envelope defined by the width W of the exterior tube 20. Similarly at the second end of the exterior tube 20 is a cooling water outlet pipe 34 whose axis is in the same plane as that of the inlet pipe 33. The inlet and outlet pipes 33, 34 each communicate with the coolant chamber 31 for the supply of coolant liquid. As coolant passes from the inlet 33 to the outlet 34 and exhaust gases pass along the small diameter tubes 38, heat transfer takes place from the exhaust gas via the surfaces of the small diameter tubes 38 to the cooling water.

The inlet 33 and outlet 34 join the exterior tube at opposite ends of the tube. In the embodiment illustrated both the inlet and outlet pipes 33, 34 incorporate a 90° bend, so that the hose connections to the ends 35 of the pipes 33, 34 may be made parallel to the longitudinal axis 50 of the tube. It is to be understood that either of the inlet or outlet pipes 33, 34 may be straight so that the hose connections to the ends 35 may be made perpendicular to the longitudinal axis 50 of the tube, or that either of the inlet or outlet pipes 33, 34 may incorporate a bend of an intermediate angle less than 90°. Either of the inlet or outlet pipes 33, 34 may be reversed so that the open end 35 faces towards the centre of the exhaust gas cooler, instead of facing away from the centre of the exhaust gas cooler as shown in FIG. 2.

A mounting plate 45 is provided on one side of the exhaust gas cooler, to enable the cooler to be secured within an engine compartment. In the embodiment shown the mounting plate has three leg portions 46 formed by double bending of the plate. These serve to space the exhaust gas cooler from the surface to which it is mounted. Each leg portion 46 has a mounting hole 47 for a bolt or similar fastener.

The oval shape of the apparatus enables the exhaust gas cooler of the invention to fit into much tighter spaces in the engine compartment than prior art coolers, while maintaining the benefits of closely packed tubes forming the cooling core. The layout of the tubes in the cooler according to the invention is novel while still maximising the efficiency of the gas and coolant flow. The cooler is highly resistant to corrosion due to its stainless steel construction, and very robust due to the absence of sharp corners on the exterior tube. The flow patterns achieved in testing have shown that the arrangement provides a high resistance to clogging from soot particles.

Although the invention shows a close packing arrangement with 37 tubes, giving the same flow area as prior art tubes, it is to be understood that other arrangements are possible. For example additional rows of tubes can be added, increasing the height H, without increasing the width W of the exterior tube 20. In a particular embodiment the top and bottom rows 60, 61 of tubes may be omitted, which in effect provides enlarged passages 62, 63 for coolant water at the top and bottom of the coolant chamber. This arrangement has been found to provide particularly advantageous flow characteristics and exhaust gas cooler performance.

These and other modifications and improvements can be incorporated without departing from the scope of the invention.

What is claimed is:

1. An exhaust gas cooler comprising:

an external tube arranged on a longitudinal axis and having first and second end walls within said tube, said external tube and end walls defining a coolant chamber between said end walls and first and second exhaust gas chambers outside said first and second end walls respectively, coolant inlet and outlet means communicating with said coolant chamber, a plurality of internal tubes extending from said first end wall to said second end wall and arranged such that the interior of each internal tube communicates with said first and second exhaust gas chambers, and exhaust gas inlet and outlet means communicating with said first and second exhaust gas chambers respectively, whereby the exhaust gas inlet and outlet means are each axially arranged on the longitudinal axis of the external tube;

characterised in that the external tube has a cross-sectional shape which has a height in the major axis which is greater than its width in the minor axis perpendicular to the major axis.

2. An exhaust gas cooler according to claim 1, wherein the cross-sectional shape of the external tube is substantially oval.

3. An exhaust gas cooler according to claim 1, wherein the cross-sectional shape of the external tube comprises two semi-circles connected by common straight line tangents parallel to the major axis.

4. An exhaust gas cooler according to claim 1, wherein the internal tubes are circular in cross-section.

5. An exhaust gas cooler according to claim 1, wherein each internal tube is spaced by the same spacing from its closest neighbouring internal tubes.

6. An exhaust gas cooler according to claim 5, wherein the spacing between adjacent internal tubes is less than 2 mm.

7. An exhaust gas cooler according to claim 5, wherein the spacing between adjacent internal tubes is between 10% and 20% of the diameter of the tubes.

8. An exhaust gas cooler according to claim 1, wherein the exhaust gas cooler is made from stainless steel.

9. An exhaust gas cooler according to claim 1, wherein each of the exhaust gas inlet and outlet means comprises a flange plate adapted to connect to a corresponding flange plate on a connecting exhaust pipe and having an aperture therein to permit the through flow of exhaust gases.

10. An exhaust gas cooler according to claim 1, wherein the coolant inlet and outlet means comprise tubular pipes adapted to be connected to a coolant hose and extending substantially in the plane containing the longitudinal axis of the external tube and the major axis of the cross-section of the external tube.

11. An exhaust gas cooler according to claim 10, wherein the coolant inlet means is located adjacent to one of the first and second end walls and the coolant outlet means is located adjacent to the other of the first and second end walls.

12. An exhaust gas cooler according to claim 10, wherein the coolant inlet means is located at one side of the external tube on the major axis and the coolant outlet means is located on the diametrically opposite side of the external tube on the major axis.

13. An exhaust gas cooler according to claim 1, wherein each of said first and second exhaust gas chambers is further defined by a tapering cylindrical member extending from said aperture to said external tube.

* * * * *